United States Patent [19]

Molzahn

[11] 3,927,512
[45] Dec. 23, 1975

[54] HARVESTER REEL

[75] Inventor: Herbert W. Molzahn, Hamilton, Canada

[73] Assignee: International Harvester Company, Chicago, Ill.

[22] Filed: Aug. 2, 1972

[21] Appl. No.: 277,183

[52] U.S. Cl. ............................................. 56/220
[51] Int. Cl.² ...................................... A01D 57/02
[58] Field of Search ...................... 56/220, 221, 226

[56] References Cited
UNITED STATES PATENTS

| | | | |
|---|---|---|---|
| 2,102,709 | 12/1937 | Hume et al. | 56/220 |
| 3,550,366 | 12/1970 | Gibson | 56/226 |
| 3,555,796 | 1/1971 | Baumeister | 56/221 |

*Primary Examiner*—Louis G. Mancene
*Assistant Examiner*—James D. Hamilton
*Attorney, Agent, or Firm*—Neal C. Johnson; Floyd B. Harman

[57] ABSTRACT

A crop harvesting platform for a windrower including a cutter, a reel, and conveyors for performing the usual steps in a crop windrowing operation. The reel includes a central shaft, driven at one end, and from which a plurality of crop-engaging bats are supported through a plurality of axially spaced sets of arms. The sets of arms are secured to the shaft by respective mounting units spaced progressively further from the driven end of the shaft. The mounting units include progressively less load-transmitting structure per unit from the driven end to the undriven end of the reel shaft.

12 Claims, 4 Drawing Figures

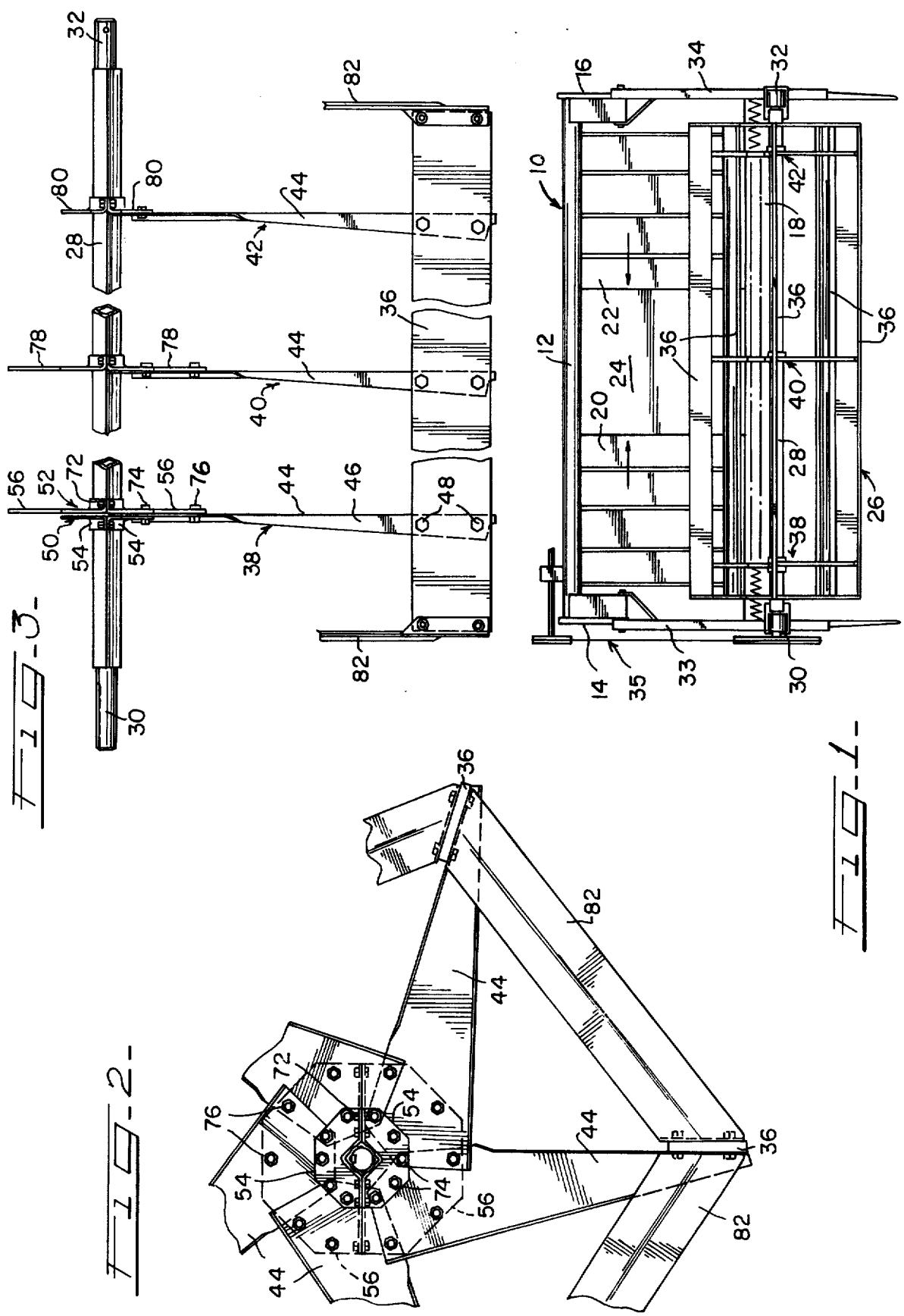

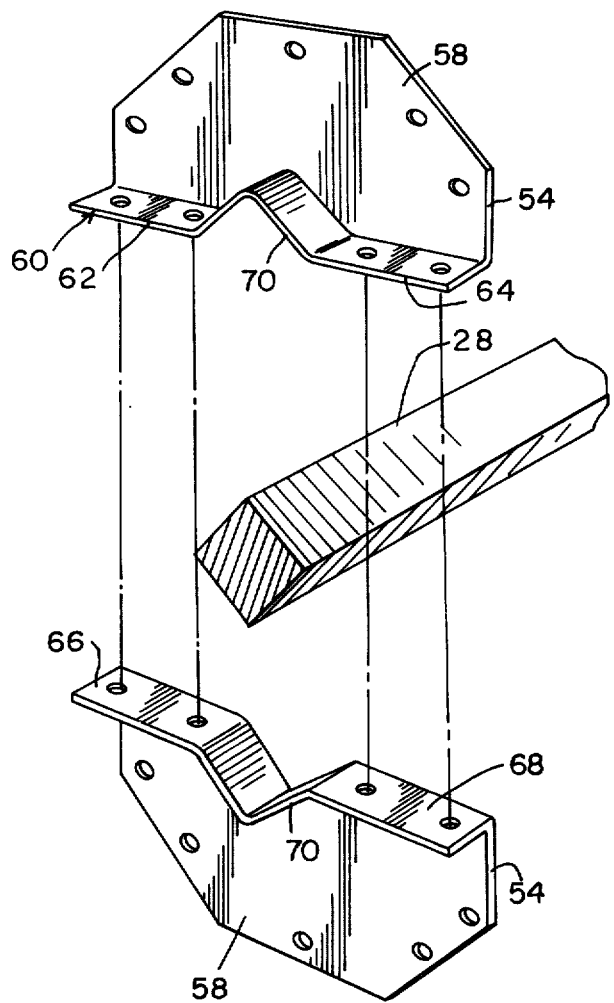

HARVESTER REEL

BACKGROUND OF THE INVENTION

1. Field of the Invention

The invention relates generally to crop harvesting elements and more particularly to an improved crop-gathering reel for a crop harvesting platform.

2. Prior Art

In general, harvester reels are constructed to include a central shaft driven at one end, a plurality of crop-engaging bats and/or rod-supported tines circumferentially spaced about the shaft, and mounting units sometimes referred to as "spiders" supporting the bats and/or rods from the central shaft at spaced points along the shaft. In the typical reel the spiders are disposed along the length of the reel at uniform intervals and are each constructed identically or very similarly to each of the others. That is, each of the spiders requires essentially the same material, time and effort to manufacture and assemble. Accordingly the time, effort, and expense involved is, in general, increased by a like amount for each spider in the reel.

While such uniformity may not at first glance appear to present problems, the fact is that the stress in the reel structure is greater at the driven end than at the undriven end due to the progressively lesser amount of torque load toward the undriven end. Accordingly, with the mounting unit or spider structure closest to the driven end being designed to withstand maximum torque load, the spider structure at the undriven end will be "overdesigned" in that it will be capable of sustaining loads significantly greater than those which it will sustain in actual use. The ultimate problem is to lower the total cost of a reel without sacrificing requisite strength and durability.

Many reels in use and shown throughout the prior art include bat-support structure which is welded to the driving shaft. Welding may reduce the strength of a cold drawn shaft and create stress concentrations. Moreover, such reels are bulky and therefore difficult and expensive to ship from the manufacturing site to the point of final assembly of the reel and the associated harvesting machine.

SUMMARY

The invention provides an improved crop-gathering reel for a harvester platform, with the improvement residing in means for supporting a plurality of crop-engaging bats from the central driven shaft of the reel. A plurality of mounting units is mounted on the shaft for supporting and transmitting driving force to the bats. The units are spaced progressively further from the driven end of the shaft and include progressively less load-transmitting structure per successive unit toward the undriven end. Accordingly, unnecessary structure is eliminated along with the time, effort, and expense associated therewith.

Additional savings are created in that the individual components of the mounting units disposed progressively from the undriven end toward the driven end of the reel, have identical counterparts in the mounting unit at the driven end of the reel.

The reel of the invention is constructed without the use of weldments and is relatively inexpensive and easy to ship because the components of the reel may be packed into a considerably smaller and less bulky units than if fully assembled.

Briefly, the objects of the invention are to provide a harvester reel in which: unnecessary structure has been eliminated with the resultant servings in time, effort, and expense of manufacture and assembly; identical components are used in a plurality of assemblies with resultant savings as above mentioned; and shipment is relatively inexpensive in that the reel may be shipped from the manufacturing facility in disassembled form.

BRIEF DESCRIPTION OF THE DRAWINGS

FIG. 1 is a plan view of a harvesting platform including the reel of the invention;

FIG. 2 is an enlarged fragmentary end elevation of the reel;

FIG. 3 is a fragmentary front elevation of the reel in partially assembled form; and, FIG. 4 is an enlarged fragmentary perspective view of a portion of the structure for supporting the crop-engaging elements from the shaft of the reel.

DESCRIPTION OF PREFERRED EMBODIMENT

Referring first to FIG. 1 there is shown a crop harvesting platform 10 of the type mountable on a self-propelled chassis, which in accordance with conventional construction includes a longitudinal beam 12 and a pair of vertical end walls 14 and 16 extending forwardly from opposite ends of the beam 12. A cutter assembly 18 extends along the forward edge of the bottom of the platform for cutting a standing crop. A pair of draper-type conveyors 20 and 22 define the bottom of the platform rearwardly of the cutter 18. The conveyors are spaced apart to define a crop discharge area 24 open to the ground. The cut crop is conveyed by the conveyors inwardly in the direction of the arrows into the area 24 and onto the ground in a windrow.

In accordance with the invention, a crop-gathering reel 26 is disposed along the forward portion of the platform above the cutter 18 for engaging the standing crop for cutting and then sweeping the cut crop rearwardly onto the conveyors 20 and 22 and through the discharge area 24. The reel 26 includes a central shaft 28 having opposite ends 30 and 32 journaled on a pair of arms 33 and 34 pivoted to the beam 12 above the end walls 14 and 16 respectively. As shown schematically in FIG. 1, power is transmitted to the end 30 of the reel shaft 28 through a drive system 35 of suitable pulleys and belts, the power being supplied from the self-propelled chassis (not shown).

The reel 26 includes a plurality of crop-engaging bats 36 circumferentially spaced about the shaft 28 and disposed to successively engage the standing crop as the reel is rotated. The bats 36 are connected to the shaft 28 by means to be now described. As shown generally in FIG. 1 the reel includes three so-called spiders shown at 38, 40 and 42 proximate to the driven end 30, midpoint, and undriven end 32, respectively of the reel. Each of the spiders includes a plurality of arms 44 connected to the bats 36 and extending generally radially inwardly toward the shaft 28. Each of the arms 44 is constructed of sheet metal having a generally triangular configuration as viewed in side elevation in FIG. 2. As best shown in FIG. 3 each arm 44 includes a right angle flange 46 disposed toward the outer end thereof to provide a flat mounting surface for the bats 36 secured thereto by bolts 48.

Each of the spiders includes means for mounting the arms 44 onto the shaft 28. As shown in FIG. 2 the arms 44 are disposed in successively overlapping relation adjacent to the shaft. The ends of the arms 44 are secured between a pair of disk assemblies 50 and 52, including respectively a pair of small disk sections 54 and a pair of large disk sections 56.

The disk sections 54 and 56 are of identical configuration, with the only difference being in the greater radial extent of the sections 56. The details of the construction of the disk sections will be clear from a description of the sections 54 shown in FIG. 4. The section 54 consists of a plate portion 58 disposed radially relative to the shaft 28. A flange 60 projects at right angles from the plate portion 58 and includes a pair of flange portions 62 and 64 extending radially inwardly from respective opposite sides of the section 54. The flange portions 62 and 64 define a pair of coplanar mounting surfaces 66 and 68. The flange 60 further includes a medial flange portion 70 between the flange portions 62 and 64 which is of concave shape complementary to the polygonal configuration of the shaft 28 as shown. The disk sections 54 are secured together by suitable bolts 72 extending through the flange portions 62 and 64 so as to dispose the mounting surfaces 66 and 68 in abutting relation. Accordingly, the respective concave flange portions 70 are positioned in opposed relation to encompass the shaft therebetween with a complementary set.

As mentioned above, the disk sections 56 of disk assembly 52 are of identical configuration but of greater radial extent. The sections 56 are mounted on the shaft in the same manner and in closely spaced relation to the assembly 50 to define a space for the arms 44. The arms 44 are secured conjointly to the disk sections 54 and 56 by a plurality of circumferentially spaced bolts 74. The arms 44 are further secured to the disk sections 56 by another plurality of circumferentially spaced bolts 76 disposed radially beyond the periphery of the disk sections 54. As shown in FIG. 2 certain of the bolts 74 and 76 are disposed within the area of overlap of the arms 44.

The above described spider 38 is disposed adjacent to the driven end 30 of the shaft and as such is subjected to maximum torque loads. In accordance with a feature of the invention the spiders 40 and 42 spaced progressively further along the shaft from the driven end, are constructed to include progressively less load-transmitting structure. Moreover, the components of the structure of each spider 40 and 42 for securing the arms thereof to the shaft are identical with components of the functionally same structure of the spider 38.

It will be understood that the spiders 40 and 42 each includes a plurality of arms 44 constructed and arranged in the same manner as the arms 44 of the spider 38. The structure by which the arms 44 on the spider 40 are mounted on the shaft 28 consists of a pair of opposed disk sections 78 identical to the disk sections 56. The disk sections 78 are mounted on the shaft 28 and connected to the arms 44 in exactly the same manner as the sections 56. The structure by which arms 44 of the spider 42 are mounted on the shaft consists of a pair of opposed disk sections 80 identical in construction with the disk sections 54. It will be seen in FIG. 3 that the only difference between the arrangement of the disks sections 80 and the disk sections 54 is that the respective flange portions project in opposite axial directions. It is apparent that the components of the spiders 40 and 42 connecting the respective arms to the shaft have identical counterparts in the spider 38.

The entire reel may be strengthened by the addition of slates 82 connected between the ends of the bats 36 at both ends of the reel as shown.

From the foregoing it will be seen that the invention provides a harvester reel of simplified and economical construction in accordance with the objects of the invention.

What is claimed is:

1. A harvester reel for engaging a standing crop and having a longitudinally extending rotatable shaft of polygonal cross section and a plurality of crop-engaging bats circumferentially spaced about the shaft for revolving about the longitudinal axis of the shaft as the shaft is rotated, wherein the improvement resides in means for supporting the bats from the shaft, comprising:

first and second disk assemblies adapted for mounting on said shaft and each including a pair of disk sections secured together in diametrically opposed relation about said shaft with a fit complementary to the polygonal cross section of said shaft, said disk assemblies being disposed in closely axially spaced relation on said shaft;

bat-support structure secured between said disk assemblies and extending radially outwardly from said shaft; and means coupling said bats to said bat-support structure.

2. The subject matter of claim 1, wherein said second disk assembly extends radially beyond the periphery of said first disk assembly, said bat-support structure being secured conjointly to said first and second disk assemblies and further secured to said second disk assembly in the portion thereof projecting radially beyond said first disk assembly.

3. The subject matter of claim 1, wherein each of said disk sections comprises a generally arcuate plate portion disposed radially relative to said shaft and further including a pair of flange portions extending radially inwardly from diametrically opposite sides respectively of said plate portion to define a pair of coplanar mounting surfaces, and a medial flange portion between said mounting surfaces defining a concave shape complementary to the polygonal cross section of said shaft.

4. The subject matter of claim 3, wherein the pair of disk sections of each of said first and second disk assemblies are secured together with the mounting surfaces thereof in abutting relation to dispose the respective medial flange portions in opposed relation to encompass said shaft therebetween.

5. A harvester reel for engaging a standing crop and having a longitudinally extending rotatable shaft of polygonal cross section and a plurality of crop-engaging bats circumferentially spaced about the shaft for revolving about the longitudinal axis of the shaft as the shaft is rotated, wherein the improvement resides in means for supporting the bats from the shaft, comprising:

first and second disk assemblies each including a pair of disk sections secured together so as to encompass said shaft with a fit complementary to its polygonal cross section, said disc assemblies being disposed in closely axially spaced relation on said shaft, said second disk assembly extending radially beyond the periphery of said first disk assembly;

a plurality of circumferentially spaced radially extending arms mounted between said first and second disk assemblies, each of said arms being secured to both said disk assemblies and further secured to said second disk assembly in the portion thereof extending radially beyond the periphery of said first disk assembly;

and means coupling said bats to the outer ends of said arms.

6. The subject matter of claim 5, wherein each of said arms is disposed in overlapping relation to the next adjacent arms, and wherein said arms are secured to said disk assemblies within the overlapping portions thereof.

7. The subject matter of claim 5, wherein each of said disk sections comprises a radially disposed plate and a flange projecting at right angles from said plate, said flange extending radially inwardly from the outer periphery of said disk section in a straight line from diametrically opposite sides of the disk section and including a generally concave polygonal medial portion shaped to provide a complementary fit with the polygonal cross section of said shaft.

8. A harvester reel for engaging a standing crop and having a longitudinally extending rotatable shaft of polygonal cross section and a plurality of crop-engaging bats circumferentially spaced about the shaft for revolving about the longitudinal axis of the shaft as the shaft is rotated, wherein the improvement resides in means for supporting the bats from the shaft, comprising:

first and second disk assemblies adapted for mounting on said shaft and each including a pair of disk sections secured together in diametrically opposed relation about said shaft with a fit complementary to the polygonal cross section of said shaft, said disk assemblies being disposed in closely axially spaced relation on said shaft;

a plurality of arms secured between said disk assemblies and extending radially outwardly from said shaft in circumferentially spaced relation;

and means coupling said bats to the outer ends of said arms.

9. The subject matter of claim 8, wherein said second disk assembly extends radially beyond the periphery of said first disk assembly, said arms being secured conjointly to said first and second disk assemblies and further secured to said second disk assembly in the portion thereof projecting radially beyond said first disk assembly.

10. The subject matter of claim 9, wherein said arms are disposed in successively overlapping relation with each other at the ends thereof adjacent to said shaft, and wherein said arms are secured to said disk assemblies within the overlapping areas.

11. The subject matter of claim 8, wherein each of said disk sections comprises a plate portion disposed radially relative to said shaft and further including a pair of flange portions extending radially inwardly from diametrically opposite sides respectively of said plate portion to define a pair of coplanar mounting surfaces, and a medial flange portion between said mounting surfaces defining a concave shape complementary to the polygonal cross section of said shaft.

12. The subject matter of claim 11, wherein the pair of disk sections of each of said first and second disk assemblies are secured together with the mounting surfaces thereof in abutting relation to dispose the respective medial flange portions in opposed relation to encompass said shaft therebetween.

* * * * *